United States Patent
Gonze et al.

(10) Patent No.: US 8,056,320 B2
(45) Date of Patent: Nov. 15, 2011

(54) COLD-START CONTROL SYSTEMS FOR INTERNAL COMBUSTION ENGINES

(75) Inventors: Eugene V. Gonze, Pinckney, MI (US); Halim G. Santoso, Novi, MI (US)

(73) Assignee: GM Global Technology Operations LLC

( * ) Notice: Subject to any disclaimer, the term of this patent is extended or adjusted under 35 U.S.C. 154(b) by 779 days.

(21) Appl. No.: 12/130,413

(22) Filed: May 30, 2008

(65) Prior Publication Data

US 2009/0293450 A1 Dec. 3, 2009

(51) Int. Cl.
*F01N 3/00* (2006.01)

(52) U.S. Cl. ............... 60/284; 60/274; 60/285; 60/295; 60/301

(58) Field of Classification Search .............. 60/273, 60/274, 284–287, 295–301
See application file for complete search history.

(56) References Cited

U.S. PATENT DOCUMENTS

| | | | | |
|---|---|---|---|---|
| 5,327,991 A | * | 7/1994 | Yoshida | 180/65.245 |
| 5,345,761 A | * | 9/1994 | King et al. | 60/274 |
| 5,357,752 A | * | 10/1994 | Lucchesi | 60/274 |
| 5,419,121 A | * | 5/1995 | Sung et al. | 60/274 |
| 5,785,137 A | * | 7/1998 | Reuyl | 180/65.245 |
| 6,235,254 B1 | * | 5/2001 | Murphy et al. | 423/212 |
| 6,477,831 B1 | * | 11/2002 | Ballinger et al. | 60/284 |
| 7,293,406 B2 | * | 11/2007 | Lewis et al. | 60/284 |
| 2004/0083716 A1 | * | 5/2004 | Twigg | 60/284 |

FOREIGN PATENT DOCUMENTS

| | | |
|---|---|---|
| DE | 4430965 | 3/1996 |
| DE | 69311927 | 1/1998 |
| DE | 102004028861 | 1/2005 |

OTHER PUBLICATIONS

Corresponding German Office Action for DE102009020809.7, dated Dec. 11, 2009, 3 Pages.

* cited by examiner

*Primary Examiner* — Thomas Denion
*Assistant Examiner* — Jesse Bogue

(57) ABSTRACT

A cold-start control system includes an air pump control module that controls an air pump and an engine starting module that starts an engine. The air pump control module activates the air pump to supply oxygen to a catalytic converter based on a temperature of the catalytic converter. The engine starting module starts the engine based on the temperature of the catalytic converter.

18 Claims, 4 Drawing Sheets

US 8,056,320 B2

COLD-START CONTROL SYSTEMS FOR INTERNAL COMBUSTION ENGINES

FIELD

The present disclosure relates to internal combustion engines, and more particularly to engine control systems and methods for internal combustion engines.

BACKGROUND

The background description provided herein is for the purpose of generally presenting the context of the disclosure. Work of the presently named inventors, to the extent that it is described in this background section, as well as aspects of the description that may not otherwise qualify as prior art at the time of filing, are neither expressly nor impliedly admitted as prior art against the present disclosure.

Catalytic converters are commonly used with internal combustion engines to reduce emissions. The catalytic converters generally operate more efficiently at elevated temperatures. When the engine is started, the catalytic converter may not be immediately effective in removing emissions from the exhaust until the catalytic converter reaches an operating temperature (e.g., a "light-off temperature"). The light-off temperature is a point where the conversion of carbon monoxide (CO), unburned hydrocarbons (HC), and nitride oxides ($NO_x$) has reached 50% efficiency.

Preheating the catalytic converter by an external heating element (e.g., electric resistance heaters) may provide extra heat to the exhaust gas and the catalytic converter to reduce the time required to reach the light-off temperature. 12-volt electrical systems on most vehicles, however, do not provide enough energy to quickly pre-heat the heating element. It may take several minutes for the heating element to heat the catalytic converter to reach the light-off temperature before the engine can be started.

SUMMARY

Accordingly, a cold-start control system includes an air pump control module that controls an air pump and an engine starting module that starts an engine. The air pump control module activates the air pump to supply oxygen to a catalytic converter based on a temperature of the catalytic converter. The engine starting module starts the engine based on the temperature of the catalytic converter.

A method of operating an engine system includes starting an engine to generate carbon monoxide based on a temperature of a catalytic converter, and directing oxygen to a catalytic converter based on the temperature of the catalytic converter.

In other features, an electrically heated catalyst (EHC) control module activates an electrically heated catalyst (EHC) to heat the catalytic converter to a first temperature. The air pump is activated and the engine is started in a first condition to generate carbon monoxide at the first temperature. In the first condition, the air/fuel ratio is smaller than a stoichiometric ratio. The catalytic converter is heated by heat released from an oxidization reaction of carbon monoxide.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
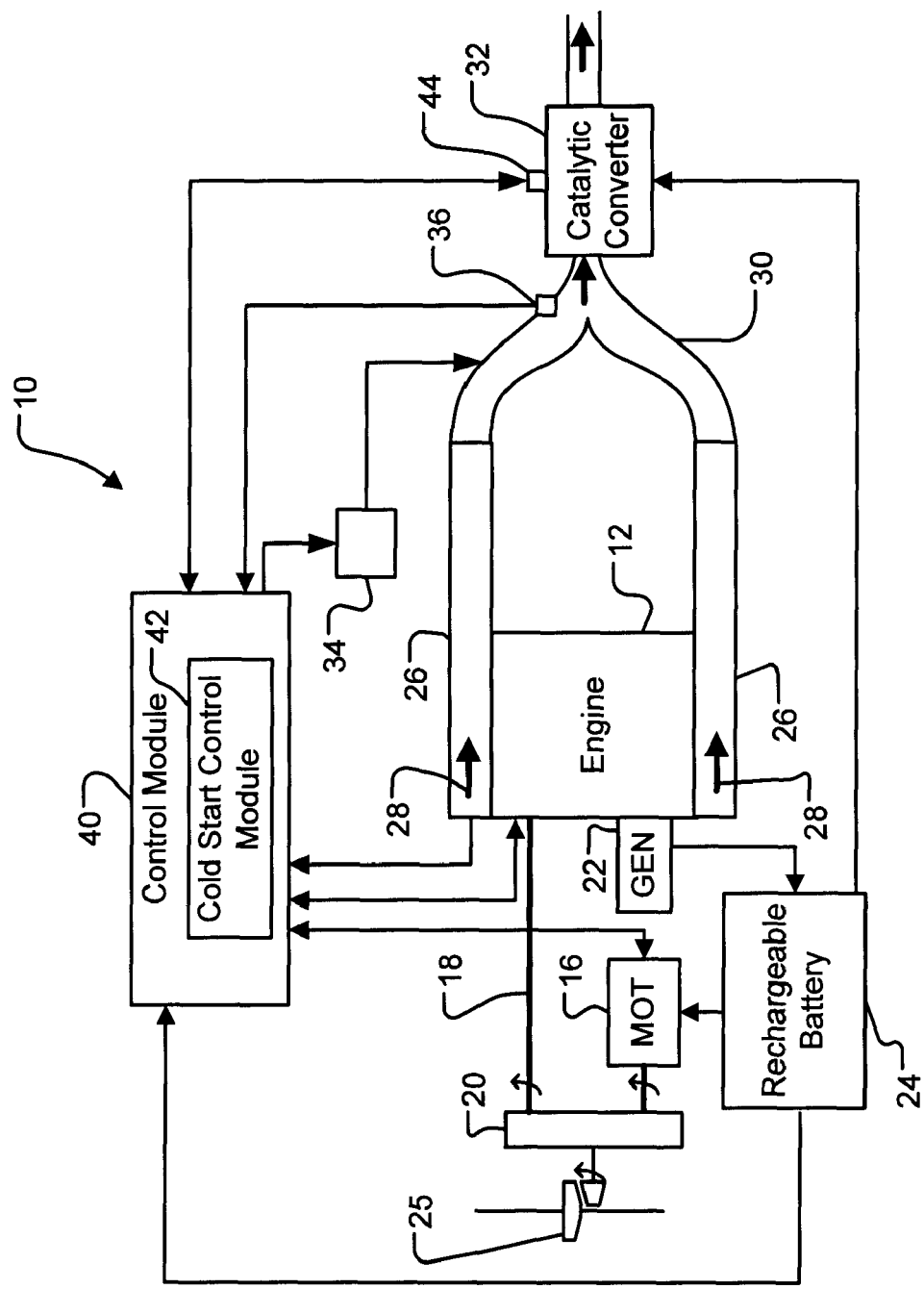
FIG. 1 is a block diagram of a hybrid vehicle including a catalytic converter according to the present disclosure.

The following description is merely exemplary in nature and is not intended to limit the present disclosure, application, or uses. For purposes of clarity, the same reference numbers will be used in the drawings to identify similar elements. As used herein, the term "module" refers to an application specific integrated circuit (ASIC), an electronic circuit, a processor (shared, dedicated, or group) and memory that execute one or more software or firmware programs, a combinational logic circuit, or other suitable components that provide the described functionality.

A cold-start control system according to the present disclosure may reduce the time to reach a light-off temperature of a catalytic converter. An electrically heated catalyst (EHC) is activated to reach a first temperature where carbon monoxide can be effectively oxidized. An air pump is activated to supply oxygen and the engine is started in a fuel-rich condition to generate carbon monoxide. The carbon monoxide is oxidized in the EHC. The heat released from the oxidizing process provides extra heating to the catalytic converter.

Referring now to FIG. 1, a hybrid vehicle 10 includes an engine 12 and an electric motor 16. The engine 12 is connected to an output shaft 18 that provides rotational power to a transmission 20. A generator 22 is driven by the engine 12 and provides charging current to a rechargeable battery 24. The motor 16 converts electric power from the battery 24 to mechanical power. The mechanical power is applied to an input shaft of the transmission 20. The transmission 20 combines power from the engine 12 and the motor 16 to provide power to a drive axle 25. The engine 12 and motor 16 may provide propulsion simultaneously or independently.

The engine 12 is connected to an exhaust manifold 26. The exhaust manifold 26 directs exhaust gas 28 from the engine 12 through an exhaust pipe 30 to a catalytic converter 32. An air pump 34 communicates with the exhaust pipe 30 and supplies oxygen to the exhaust pipe 30. A first oxygen sensor 36 is provided at the exhaust pipe 30 between the exhaust manifold 26 and the catalytic converter 32 to measure the concentration of oxygen in the exhaust gas 28 immediately before the mixture of the exhaust gas 28 and the oxygen enters the catalytic converter 32.

A control module 40 communicates with the engine 12, the motor 16, the rechargeable battery 24, the catalytic converter 32, and the air pump 34 and receives inputs from a number of sensors. The control module 40 includes a cold-start control module 42. The cold-start control module 42 communicates with a temperature sensor 44 at the catalytic converter 32 and controls the catalytic converter 32, the air pump 34, and the engine 12 based on the temperature of the catalytic converter 32.

Figure 2:
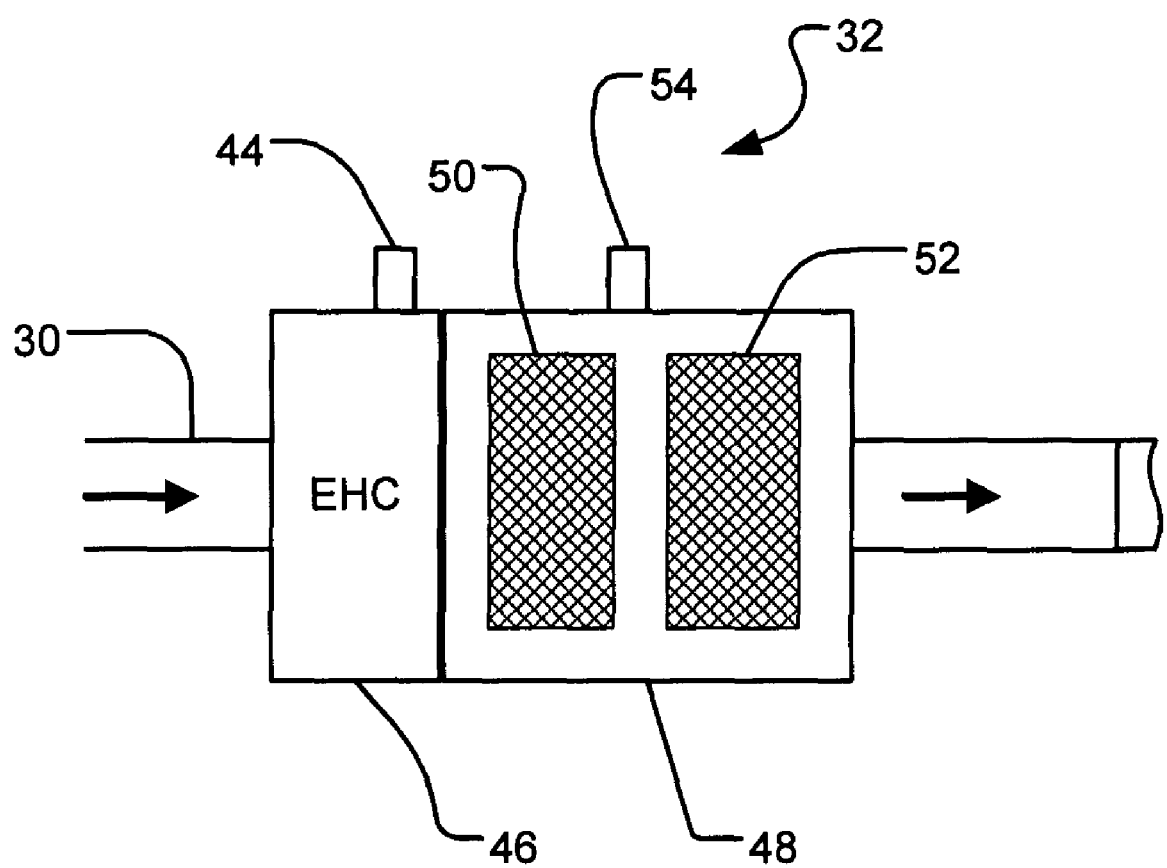
FIG. 2 is a schematic diagram of the catalytic converter of FIG. 1 according to the present disclosure.

Referring to FIG. 2, the catalytic converter 32 includes an electrically heated catalyst (EHC) 46 and a three-way catalytic converter (TWC) 48 downstream of the EHC 46.

"Three-way" refers to the three emissions that a catalytic converter reduces, including carbon monoxide (CO), unburned hydrocarbons (HCs) and nitrogen oxides ($NO_x$). The EHC 46 is mounted at an inlet end of the TWC 48. The EHC 46 may be a separate assembly from the TWC 48 or integrally formed as a part of the TWC 48. The EHC 46 may be powered by the rechargeable battery 24 (shown in FIG. 1) to provide heat to the exhaust gas passing through the EHC 46 so that the TWC 48 can be more quickly heated to a light-off temperature. The "light-off temperature" is the temperature where the conversion of carbon monoxide (CO), hydrogen carbons (HC), and nitride oxides ($NO_x$) has reached 50% efficiency. The EHC 46 includes an oxidizing catalyst suitable for oxidizing carbon monoxide. The temperature sensor 44 is provided at the EHC 46 to measure the temperature of the catalytic converter 32, particularly the EHC 46.

The TWC 48 may include an upstream catalyst 50 and a downstream catalyst 52 positioned within a common housing. The upstream catalyst 50 includes catalyst materials suitable for reducing $NO_x$, whereas the downstream catalyst 52 includes catalyst materials that stimulate oxidation of HC and CO molecules. A second oxygen sensor 54 may be provided at the TWC 48 between the upstream catalyst 50 and the downstream catalyst 52 to monitor the concentration of oxygen within the TWC 48.

Figure 3:
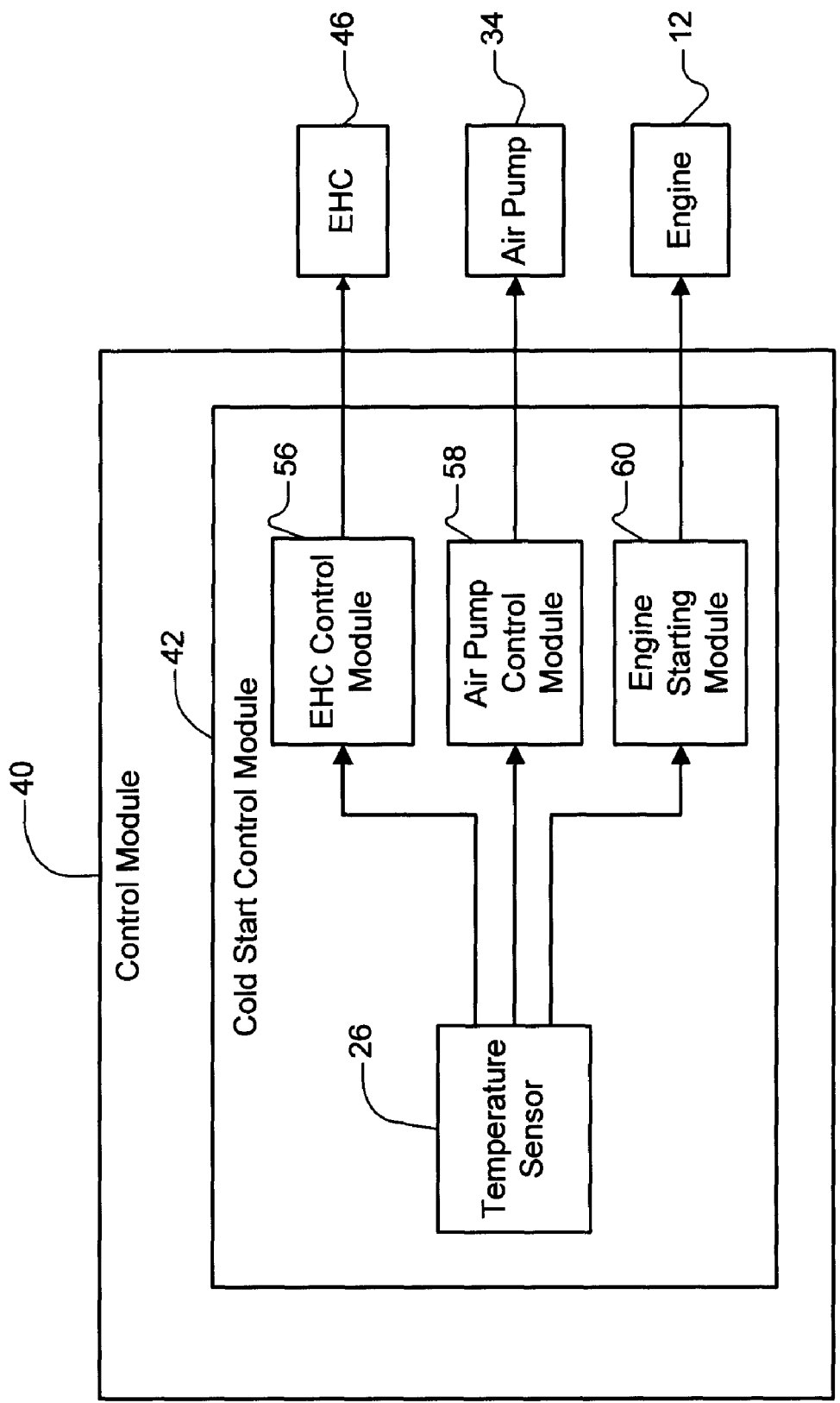
FIG. 3 is a block diagram of a control module that controls an engine system according to the present disclosure.

Referring to FIG. 3, the control module 40 includes the cold-start control module 42 that is activated when a cold condition exists. The cold-start control module 42 includes an EHC control module 56, an air pump control module 58, and an engine starting module 60 that communicate with the temperature sensor 26. The cold-start control module 42 controls the EHC 46, the air pump 34, and the engine 12 based on the temperature measured by the temperature sensor 26.

When a driver sends an engine start request to the control module 40, for example, by switching on the starting circuit (not shown), the motor 16 is started. The control module 40 may evaluate data including the ambient air temperature, the engine coolant temperature, and the exhaust gas flow to estimate whether a cold-start condition exists. A cold-start condition does not necessarily exist when a start request is made due to constant stops and restarts of the hybrid vehicle 10.

In one example, the control module 40 may compare a measured engine coolant temperature with a predetermined threshold. If the engine coolant temperature is below the predetermined threshold, it is determined that a cold-start condition exists. The EHC control module 56 may activate the EHC 46 to heat the catalytic converter 32.

When the EHC 46 reaches a first temperature (for example 250° C.) where carbon monoxide can be effectively converted into carbon dioxide, the air pump control module 58 may activate the air pump 34 to supply air (including oxygen) to the EHC 32. Concurrently, the engine starting module 60 may start the engine 12 in a fuel-rich condition, i.e., the air/fuel ratio is smaller than a stoichiometric ratio (14.7:1 for gasoline engines). When the engine 12 is operated in a fuel-rich condition, the engine 12 generates a first amount of carbon monoxide that is greater than what is generated in normal conditions (for example only, the stoichiometric condition). The first amount of carbon monoxide is delivered to the EHC 32 to be mixed with a second amount of oxygen from the air pump 34. The second amount may be a function of the first amount. The first amount of carbon monoxide may be completely reacted with the second amount of oxygen so that no carbon monoxide remains in the EHC 32 after the oxidizing process. The first amount and the second amount may be determined based on the following relationship:

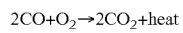

$$2CO + O_2 \rightarrow 2CO_2 + \text{heat}$$

The first amount of carbon monoxide that needs to be generated in the fuel-rich condition depends on the heat to be applied to the TWC 48 and the volume of the oxidizing catalyst on the EHC 46. The first amount of carbon monoxide is sent to the exhaust pipe 30 and mixed with the second amount of oxygen flowing from the air pump 34. Because the EHC 46 is already at the first temperature where carbon monoxide can be effectively oxidized, the mixture of the oxygen and carbon monoxide may immediately undergo an oxidization process in the EHC 46. The carbon monoxide is oxidized into carbon dioxide ($CO_2$) and heat is released from the exothermic reaction between the carbon monoxide and the oxygen. The heat released from the oxidizing process provides extra heating to the TWC 48 in addition to the electric heating provided by the EHC 46 to heat the TWC 48 to a second temperature (e.g., the light-off temperature).

The control module 40 may include a control algorithm (not shown) for predicting the amount of catalyst volume that is active. The parameters for the control algorithm may include a predicted EHC temperature, substrate material properties, and the time the EHC is energized. The catalyst volume that is required to be active at the light-off temperature depends on emission standards, engine out emissions, and catalyst efficiencies.

When the control algorithm of the control module 40 determines that a required amount of catalyst volume is active and the light-off temperature is reached, the control module 40 may de-activate the EHC 46 and switch the engine 12 to a normal mode, for example, the stoichiometric condition. When the engine 12 is operated under the stoichiometric condition, the TWC 48 can efficiently convert $NO_x$, CO and HO to reduce emissions. The upstream catalyst 46 reduces $NO_x$ and the downstream catalyst 48 oxidizes CO and HC.

Figure 4:
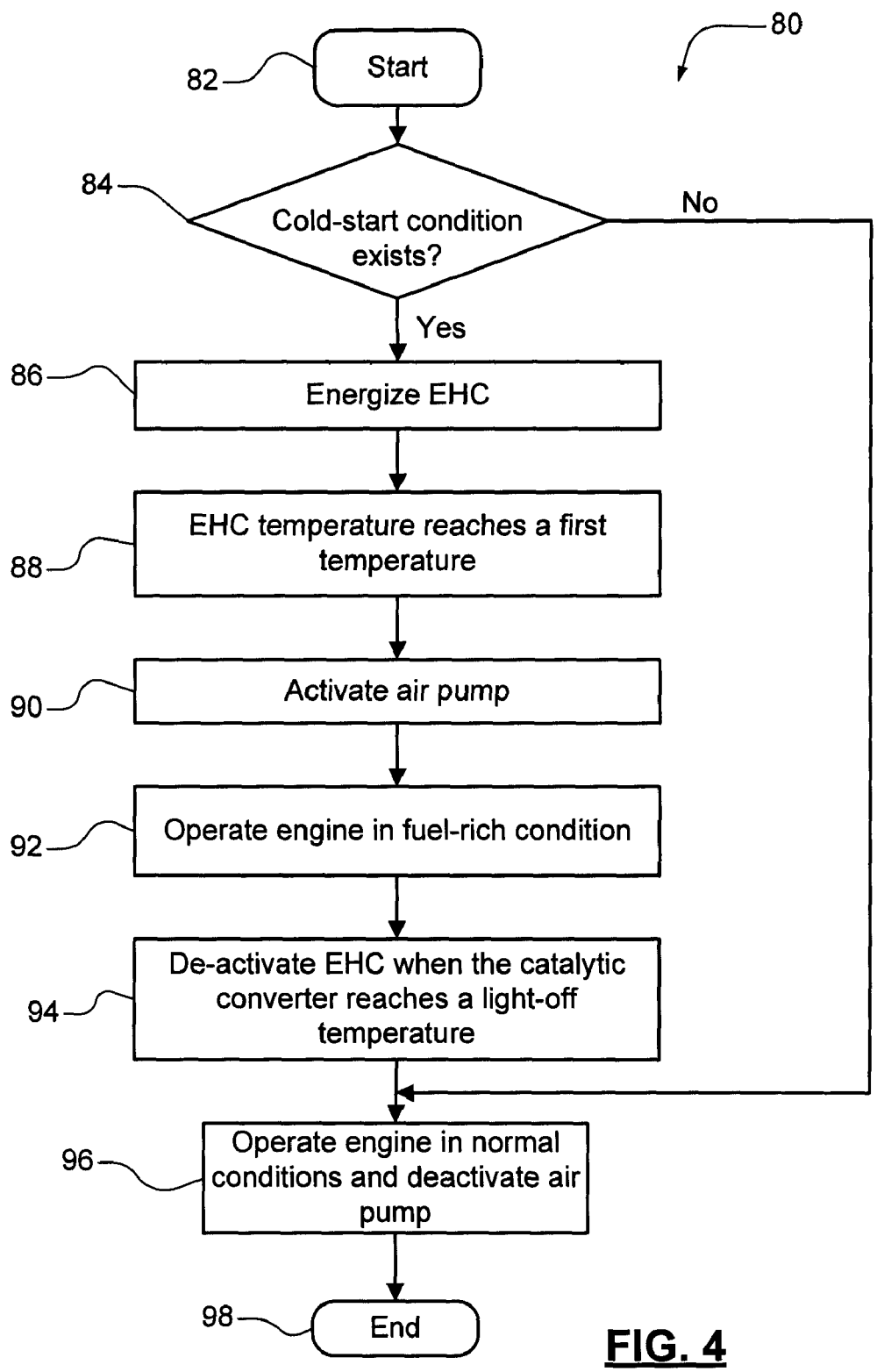
FIG. 4 is a flow diagram of a method of operating an engine system according to the present disclosure.

Referring to FIG. 4, a method 80 of operating an engine system starts at step 82. To start an engine 12, the control module 40 determines whether a cold-start condition exists in step 84. If the cold-start condition does not exist, the control module 40 operates the engine in normal conditions. If the cold-start condition exists, the cold-start control module 42 controls the EHC 46, the air pump 34 and the engine 12 according to the temperature of the catalytic converter 32 measured by the temperature sensor 26. The EHC 46 is first activated in step 86. When the EHC 46 reaches a first temperature in step 88, the air pump 34 is activated in step 90. Concurrently, the engine 12 is started in a fuel-rich condition in step 92 to generate a first amount of carbon monoxide. The first amount of carbon monoxide is oxidized at the first temperature and heat is released from the oxidizing process to heat the catalytic converter 32. When the catalytic converter 32 reaches a second temperature, i.e., the light-off temperature, the EHC 46 is de-activated in step 94. Concurrently, the engine 12 is operated in normal conditions and the air pump 34 is deactivated in step 96. The method 80 ends in step 98.

With the cold-start control module 42 of the present disclosure, less battery energy is used to heat the EHC 46 and to start the exothermic reaction in the EHC 46. A significant amount of heat comes from the exothermic reaction between carbon monoxide and oxygen. Therefore, the cold-start control module 42 enables the TWC 48 to quickly reach a light-off temperature with less consumption of battery energy and without an additional device.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A cold-start control system comprising:
an electrically heated catalyst (EHC) control module that activates an EHC to heat a catalytic converter when a temperature of the catalytic converter is less than a first predetermined temperature;
an air pump control module that activates an air pump when the temperature of the catalytic converter is greater than a second predetermined temperature thereby supplying oxygen to the catalytic converter, wherein the second predetermined temperature is greater than the first predetermined temperature;
an engine starting module that starts an engine at a predetermined rich air/fuel (A/F) ratio when the temperature of the catalytic converter is greater than the second predetermined temperature thereby supplying carbon monoxide to the catalytic converter; and
a control module that predicts a volume of active catalyst in the catalytic converter.

2. The cold-start control system of claim 1, wherein the air pump control module controls the air pump to control an amount of oxygen provided to the catalytic converter based on an amount of carbon monoxide provided to the catalytic converter.

3. The cold-start control system of claim 1, wherein the control module predicts the volume of active catalyst in the catalytic converter based on at least one of a predicted EHC temperature, a material property of a substrate of the catalytic converter, and a period that the EHC has been activated.

4. The cold-start control system of claim 1, wherein when both (i) the predicted volume is greater than a predetermined volume and (ii) the temperature of the catalytic converter is greater than a third predetermined temperature, the control module both (i) deactivates the EHC and (ii) commands the engine to a predetermined A/F ratio, wherein the third predetermined temperature is greater than the second predetermined temperature.

5. The cold-start control system of claim 4, wherein the third predetermined temperature is a catalyst light-off temperature.

6. The cold-start control system of claim 4, wherein the predetermined A/F ratio is a stoichiometric A/F ratio.

7. The cold-start control system of claim 1, wherein the control module further controls exhaust gas flow to limit an amount of hydrocarbon (HC) slip.

8. The cold-start control system of claim 1, wherein the second predetermined temperature is a temperature at which the catalytic converter is capable of oxidizing carbon monoxide.

9. A method of operating an engine system comprising:
activating an electrically heated catalyst (EHC) to heat a catalytic converter when a temperature of the catalytic converter is less than a first predetermined temperature;
starting an engine at a predetermined rich air/fuel (A/F) ratio when the temperature of the catalytic converter is greater than a second predetermined temperature thereby supplying carbon monoxide to the catalytic converter, wherein the second predetermined temperature is greater than the first predetermined temperature;
activating an air pump when the temperature of the catalytic converter is greater than the second predetermined temperature thereby supplying oxygen to the catalytic converter; and
predicting a volume of active catalyst in the catalytic converter.

10. The method of claim 9, further comprising controlling the air pump to control an amount of oxygen provided to the catalytic converter based on an amount of carbon monoxide provided to the catalytic converter.

11. The method of claim 9, further comprising predicting the volume of active catalyst in the catalytic converter based on at least one of a predicted EHC temperature, a material property of a substrate of the catalytic converter, and a period that the EHC has been activated.

12. The method of claim 9, further comprising when both (i) the predicted volume is greater than a predetermined volume and (ii) the temperature of the catalytic converter is greater than a third predetermined temperature, both (i) deactivating the EHC and (ii) commanding the engine to a predetermined A/F ratio, wherein the third predetermined temperature is greater than the second predetermined temperature.

13. The method of claim 12, wherein the third predetermined temperature is a catalyst light-off temperature.

14. The method of claim 12, wherein the predetermined A/F ratio is a stoichiometric A/F ratio.

15. The method of claim 9, further comprising controlling exhaust gas flow to limit an amount of hydrocarbon (HC) slip.

16. The method of claim 9, wherein the second predetermined temperature is a temperature at which the catalytic converter is capable of oxidizing carbon monoxide.

17. The method of claim 9, further comprising activating the EHC when the temperature of the catalytic converter decreases below the first predetermined temperature during an engine-off period when a vehicle is powered by an electric motor and a battery system.

18. A hybrid vehicle, comprising:
the cold-start control system of claim 1;
the engine;
an electric motor; and
a battery system,
wherein the cold-start control system activates the EHC when the temperature of the catalytic converter decreases below the first predetermined temperature during an engine-off period when the vehicle is powered by the electric motor and the battery system.

* * * * *